(12) United States Patent
Shao et al.

(10) Patent No.: US 12,165,507 B2
(45) Date of Patent: Dec. 10, 2024

(54) METHODS AND INTERNET OF THINGS SYSTEMS FOR MANAGING TRAFFIC ROAD CLEANING IN SMART CITY

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Haitang Xiang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 254 days.

(21) Appl. No.: 17/664,876

(22) Filed: May 25, 2022

(65) Prior Publication Data
US 2023/0386327 A1 Nov. 30, 2023

(51) Int. Cl.
*G08G 1/01* (2006.01)
*E01H 1/00* (2006.01)
*G06V 20/40* (2022.01)
*G16Y 10/40* (2020.01)
*G16Y 40/10* (2020.01)
*H04N 7/18* (2006.01)

(52) U.S. Cl.
CPC ............ *G08G 1/0145* (2013.01); *E01H 1/00* (2013.01); *G06V 20/41* (2022.01); *G06V 20/46* (2022.01); *G08G 1/0116* (2013.01); *G08G 1/0133* (2013.01); *G16Y 10/40* (2020.01); *G16Y 40/10* (2020.01); *H04N 7/181* (2013.01)

(58) Field of Classification Search
CPC .. G08G 1/0116; G08G 1/0133; G08G 1/0145; G06V 20/41; G06V 20/46; G16Y 10/40; G16Y 40/10; H04N 7/181; E01H 1/00
See application file for complete search history.

(56) References Cited

U.S. PATENT DOCUMENTS

| | | | | |
|---|---|---|---|---|
| 11,305,777 B2* | 4/2022 | Batts | ................... | G01B 5/28 |
| 11,353,873 B2* | 6/2022 | Lacaze | ............. | B60W 60/0025 |
| 11,508,237 B2* | 11/2022 | Ewert | ................... | G06V 20/56 |
| 11,776,409 B2* | 10/2023 | Shao | ................... | G08G 1/202 |
| | | | | 701/533 |

(Continued)

OTHER PUBLICATIONS

White Paper on Urban Brain Development, Smart City Standard Working Group of National Beacon Commission, 2022, 59 pages.

(Continued)

*Primary Examiner* — Joseph C Rodriguez
(74) *Attorney, Agent, or Firm* — METIS IP LLC

(57) ABSTRACT

The embodiments of the present disclosure provide methods and Internet of Things systems for managing traffic road cleaning in smart city. The method is executed by a traffic management platform, comprising: obtaining a road video captured by an imaging device on a road during a time period; extracting a target image from the road video and processing the target image through a prediction model to predict a road cleanliness; processing the road video in the time period and predicting a flow corresponding to the road; and controlling a road sweeper to clean the road based on the flow and the road cleanliness.

15 Claims, 5 Drawing Sheets

(56) References Cited

U.S. PATENT DOCUMENTS

| | | | |
|---|---|---|---|
| 2007/0021944 A1* | 1/2007 | Levy | G05D 1/0297 |
| | | | 702/188 |
| 2018/0148900 A1* | 5/2018 | Rohrbaugh | G01B 11/306 |
| 2018/0376305 A1* | 12/2018 | Ramalho de Oliveira | |
| | | | H04W 4/44 |
| 2020/0112973 A1* | 4/2020 | Cross | G08G 1/09675 |
| 2020/0184808 A1* | 6/2020 | Ewert | G08G 1/0145 |
| 2020/0238999 A1* | 7/2020 | Batts | G08G 1/0112 |
| 2020/0410783 A1* | 12/2020 | Duarte Gelvez | B60W 60/001 |
| 2021/0350127 A1* | 11/2021 | Droux | B64C 39/024 |
| 2023/0213347 A1* | 7/2023 | Shao | A47L 11/4061 |
| 2024/0044094 A1* | 2/2024 | Kramer | E01H 1/003 |

OTHER PUBLICATIONS

Shao, Zehua, Exploration and Research on the Structure of Internet of Things, Internet of Things Technologies Reliable Transmission, 2015, 10 pages.

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

* cited by examiner

METHODS AND INTERNET OF THINGS SYSTEMS FOR MANAGING TRAFFIC ROAD CLEANING IN SMART CITY

TECHNICAL FIELD

The present disclosure generally relates to cleaning management field, and in particular, to methods and Internet of Things systems for managing traffic road cleaning in smart city.

BACKGROUND

With the rapid development of society, the flow of people and vehicles on urban roads is also increasing. The raised dust and discarded objects may gradually affect the cleanliness of the roads. How to make the roads clean has gradually become a problem that cannot be ignored in urban construction.

Therefore, it is hoped to provide a technical scheme that can better identify the road cleanliness and control a road sweeper to clean the roads.

SUMMARY

One aspect of the embodiments of the present disclosure provides a method for managing traffic road cleaning in a smart city, executed by a traffic management platform. The method comprises: obtaining a road video captured by an imaging device on a road during a time period; extracting a target image from the road video and processing the target image through a prediction model to predict a road cleanliness; processing the road video during the time period and predicting a flow corresponding to the road; and controlling a road sweeper to clean the road based on the flow and the road cleanliness.

One aspect of the embodiments of the present disclosure provides an Internet of Things (IOT) system for managing traffic road cleaning in a smart city. The IOT system comprises a traffic management platform, wherein the traffic management platform is configured to perform the following operations: obtaining a road video captured by an imaging device on a road during a time period; extracting a target image from the road video and processing the target image through a prediction model to predict a road cleanliness; processing the road video in the time period and predicting a flow corresponding to the road; and controlling a road sweeper to clean the road based on the flow and the road cleanliness.

One aspect of the embodiments of the present disclosure provides a computer-readable storage medium, which stores computer instructions, when the computer reads the computer instructions in the storage medium, the computer runs the method for managing traffic road cleaning in a smart city.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
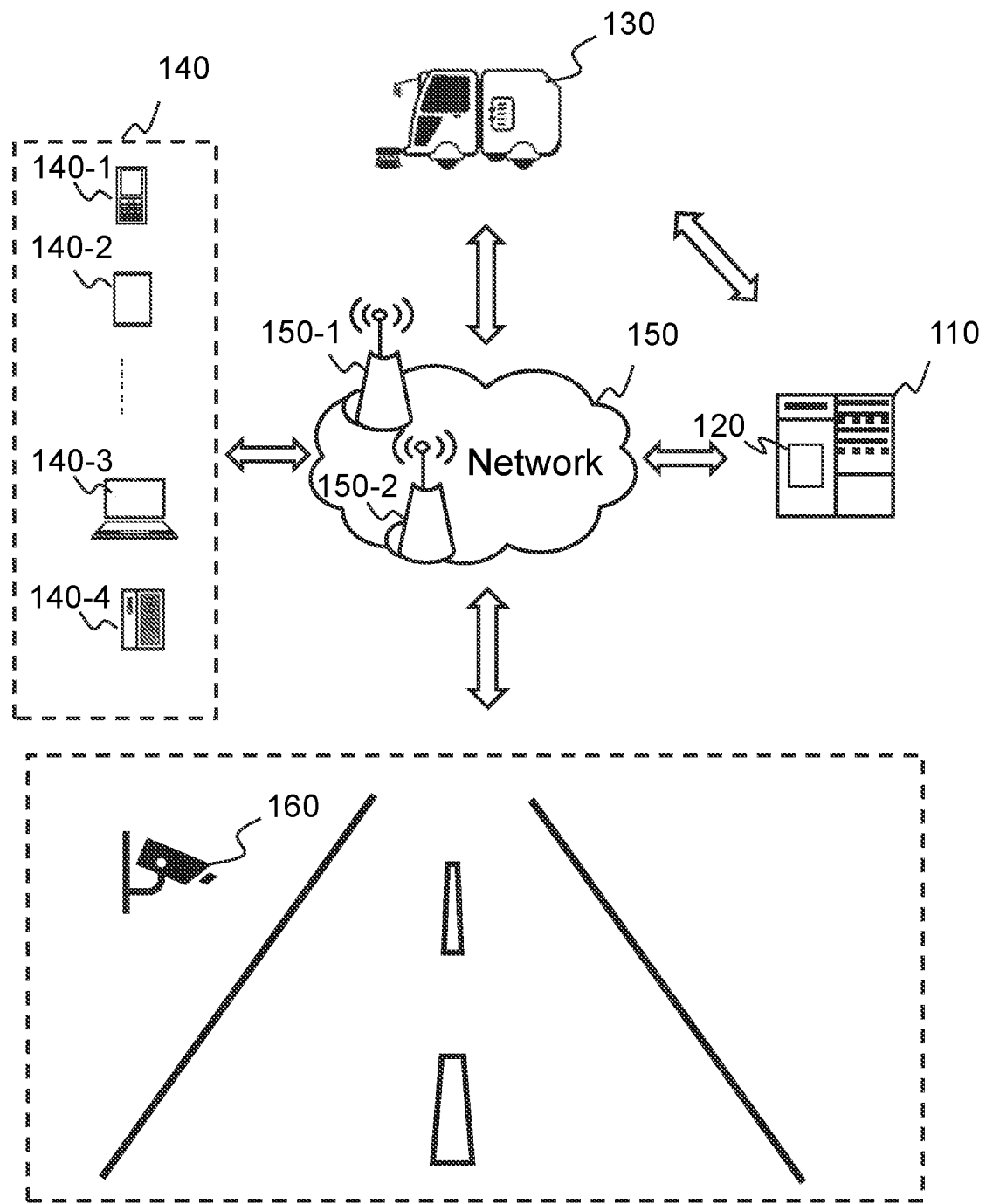
FIG. 1 is a schematic diagram illustrating an exemplary application scenario of a method for managing traffic road cleaning in a smart city according to some embodiments of the present disclosure.

In order to more clearly explain the technical scheme of the embodiment of this specification, the accompanying drawings required in the description of the embodiment will be briefly introduced below. Obviously, the drawings in the following description are only some examples or embodiments of this specification. For those skilled in the art, this specification may also be applied to other similar situations according to these drawings without paying creative labor. Unless it is obvious from the language environment or otherwise explained, the same label in the figure represents the same structure or operation.

It should be understood that the "system", "device", "unit" and/or "module" used herein is a method for distinguishing different components, elements, components, parts or assemblies at different levels. However, if other words can achieve the same purpose, they can be replaced by other expressions.

As shown in the description and claims, the words "one" and/or "an", "a", "the" do not specifically refer to the singular, but may also include the plural, unless there are specific exceptions. Generally speaking, the terms "include" only indicates that the steps and elements that have been clearly identified are included, and these steps and elements do not constitute an exclusive list, and the method or equipment may also contain other steps or elements.

A flowchart is used in this specification to illustrate the operation performed by the system according to the embodiment of this specification. It should be understood that the previous or subsequent operations are not necessarily performed accurately in order. Instead, the steps may be processed in reverse order or simultaneously. At the same time, you may add other operations to these processes or remove one or more steps from these processes.

The embodiments of the present disclosure relate to a method, Internet of things system and storage medium for managing traffic road cleaning in a smart city (also referred to as the method, Internet of things system in short), which may be applied to smart terminals such as mobile phones, tablet computers and laptops. The application fields may be municipal sanitation, indoor cleaning, etc. In some embodiments, the method and the Internet of things system may be applied to the smart city traffic road cleaning management monitoring terminal, such as road camera, traffic flow monitoring system, etc.; In some embodiments, the method and the IOT system for managing traffic road cleaning in a smart city may be applied to management/user terminals, such as road cleaning monitoring platform, traffic flow monitoring platform, etc.; In some embodiments, the method and the IOT system for managing traffic road cleaning in a smart city may be applied to cleaning terminals, such as road cleaning vehicles, cleaning robots, etc. In some embodiments, the method, the IOT system and the storage medium for managing traffic road cleaning in a smart city may be applied to other fields, such as traffic flow monitoring, smart city and so on. The present disclosure is aimed at the allocation and management of traffic road cleaning resources.

FIG. 1 is a schematic diagram illustrating an exemplary application scenario of the IOT system for managing traffic road cleaning in a smart city according to some embodiments of the present disclosure.

In some embodiments, the application scenario 100 of the IOT system for managing traffic road cleaning in a smart city may include a server 110, a processing device 120, a cleaning device 130, a first terminal 140, a network 150, and a second terminal 160.

In some embodiments, the server 110 may be used to process information and/or data related to the application scenario 100. For example, it may be used to extract the target image from the road video and predict the road cleanliness by processing the target image. In some embodiments, the server 110 may be a single server or a group of servers. The server group may be centralized or distributed (for example, the server 110 may be a distributed system). In some embodiments, the server 110 may be local or remote. For example, the server 110 may access information and/or data stored in the cleaning device 130, the first terminal 140, and the second terminal 160 via the network 150. As another example, the server 110 may be directly connected to the cleaning device 130, the first terminal 140 and/or the second terminal 160 to access stored information and/or data.

In some embodiments, the server 110 may include the processing device 120. The processing device 120 may process information and/or data related to the application scenario 100 to perform one or more functions described in the present disclosure. For example, the processing device 120 may extract the target image from the road video and process the target image through the prediction model to predict the road cleanliness. In some embodiments, the processing device 120 may include one or more processing engines (e.g., a single-chip processing engine or a multi-chip processing engine). As an example, the processing device 120 may include a central processing unit (CPU).

The cleaning device 130 may be used to perform a cleaning action in response to data and/or instructions issued by the server 110 or the processing device 120. In some embodiments, the cleaning device 130 may be a road cleaning vehicle, a cleaning robot, a sweeping robot, and the like. In some embodiments, the cleaning device 130 may perform a cleaning action spontaneously. In some embodiments, the cleaning device 130 may also perform other actions such as watering, wiping, spraying detergent, etc.

The first terminal 140 may be a device or other entity directly related to smart city traffic road cleaning management. In some embodiments, the first terminal 140 may be a terminal used by the manager of traffic road cleaning management in a smart city, such as a terminal used by the staff of the environmental sanitation department. In some embodiments, the first terminal 140 may include a mobile device 140-1, a tablet 140-2, a laptop 140-3, a laptop PC 140-4, or any combination thereof. In some embodiments, the mobile device 140-1 may include a smartphone, a smart paging device, or other smart device. In some embodiments, the first terminal 140 may include other intelligent terminals, such as wearable intelligent terminals. The first terminal 140 may be an intelligent terminal or an entity including an intelligent terminal, such as a management device including an intelligent computer.

The network 150 may facilitate the exchange of information and/or data. In some embodiments, one or more components of the application scenario 100 (e.g., the server 110, the first terminal 140, the second terminal 160) may send information and/or data to other components of the application scenario 100 via the network 150. For example, the server 110 may obtain user instructions from the first terminal 140 via the network 150. In some embodiments, the network 150 may be a wired network, a wireless network, or the like, or any combination thereof. For example, the network 150 may include a cable network. In some embodiments, the application scenario 100 may include one or more network access points. For example, base stations and/or wireless access points 150-1, 150-2, . . . , one or more components of the application scenario 100 may be connected to the network 150 to exchange data and/or information.

The second terminal 160 is a terminal for acquiring road information, such as an imaging device, a microphone, a scanner, etc. In some embodiments, the second terminal 160 may be an executor of road video acquisition. In some embodiments, the second terminal 160 may acquire a road video and other information of the road. In some embodiments, the second terminal 160 may include an image processing device, such as a device for extracting the target image from the road video. In some embodiments, the functions of the first terminal 140 and the second terminal 160 may be implemented on the same device or multiple devices.

It should be noted that the application scenario 100 is provided for illustrative purposes only and is not intended to limit the scope of the present disclosure. For those skilled in the art, various modifications or changes may be made according to the description of this specification. For example, the application scenario 100 may also include a storage device. As another example, the application scenario 100 may implement similar or different functions on other devices. However, these changes and modifications will not deviate from the scope of this application.

The Internet of things system is an information processing system that includes some or all of the management platform, sensor network platform and object platform. Among them, the management platform may realize the overall planning and coordination of the contact and cooperation between various functional platforms (such as sensor network platform and object platform). The management platform gathers the information of the Internet of things operation system and may provide the perception management and control management functions for the Internet of things operation system. The sensor network platform may realize the connection management platform and object platform, and plays the functions of sensing information sensing communication and controlling information sensing communication. Object platform is a functional platform for generating and executing perception information and control information.

The information processing in the Internet of things system may be divided into the processing flow of perception information and the processing flow of control information. The control information may be the information generated based on perception information. Among them, the processing of perception information is that the object platform obtains the perception information and transmits it to the management platform through the sensor network platform. The control information is distributed from the management platform to the object platform through the sensor network platform, so as to realize the control of the corresponding object.

In some embodiments, when the Internet of things system is applied to smart city management, it may be called Internet of things system for smart city.

Figure 2:
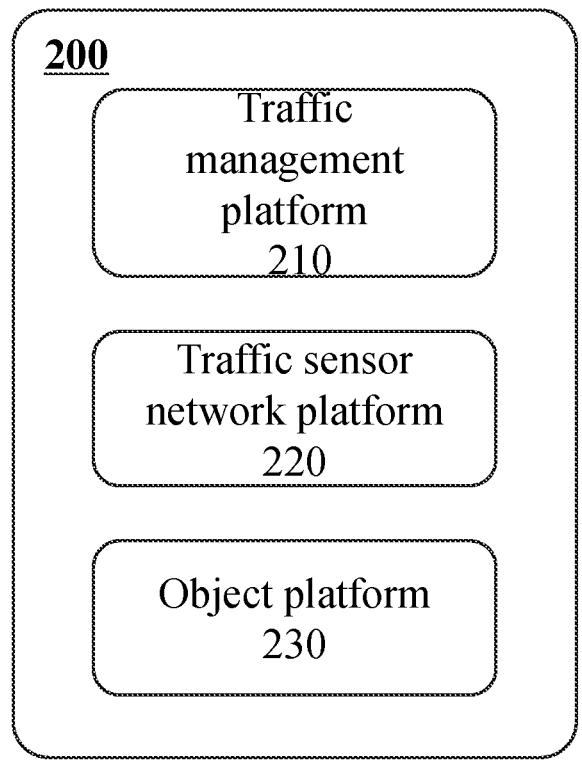
FIG. 2 is a system diagram of the Internet of things system for managing traffic road cleaning in a smart city according to some embodiments of the present disclosure.

FIG. 2 is a system diagram of the IOT system 200 for managing traffic road cleaning in a smart city according to some embodiments of the present disclosure. In some embodiments, the IOT system 200 (or the system 200) may include a traffic management platform 210, a traffic sensor network platform 220, and an object platform 230. In some embodiments, the system 200 may be part of or implemented by the processing device 120.

In some embodiments, the system 200 may be applied to a variety of scenarios where the environment is need to clean. In some embodiments, the system 200 may obtain the cleanliness data and flow data under various scenes to obtain the cleanliness management strategy under each scene. In some embodiments, the system 200 may obtain the cleaning management strategy of the whole area (such as the whole city) based on the obtained cleanliness data and flow data under each scene.

Various scenes of cleaning management may include, for example, road cleaning scene, indoor cleaning scene, etc. Various scenes of cleaning management may include, for example, cleaning equipment management, cleaning worker management, road cleanliness evaluation, etc. It should be noted that the above scenarios are only examples and do not limit the specific application scenarios of the system 200. Those skilled in the art may apply the system 200 to any other suitable scenarios on the basis of the contents disclosed in the embodiments.

In some embodiments, the system 200 may be applied to cleaning equipment management. When applied to cleaning equipment management, the object platform 230 may be used to collect data related to cleaning equipment, such as the service year of cleaning equipment, cleaning capacity of cleaning equipment, model of cleaning equipment, failure rate of cleaning equipment, etc. The object platform 230 may upload the collected relevant data to the traffic sensor network platform 220, and the traffic sensor network platform 220 may summarize and process the collected data. For example, the traffic sensor network platform 220 may classify the collected data by road, cleaning equipment and cleaning ability, etc. The traffic sensor network platform 220 then sends the further collected and processed data to the traffic management platform 210, and the traffic management platform 210 makes strategies or instructions related to cleaning equipment management based on the processing of the collected data, such as replacement of cleaning equipment, maintenance of cleaning equipment, etc.

In some embodiments, the system 200 may be applied to cleaner (i.e., cleaning worker) management. When applied to cleaner management, the object platform 230 may be used to collect data related to cleaner management, such as number of cleaners, leave of cleaners, labor ability of cleaners, etc. The object platform 230 may upload the collected data related to cleaner management to the traffic sensor network platform 220, and the traffic sensor network platform 220 may summarize and process the collected data. For example, the traffic sensor network platform 220 may classify the collected data according to each cleaner and sort them according to the labor ability of cleaners, etc. The traffic sensor network platform 220 then uploads the further collected and processed data to the traffic management platform 210, and the traffic management platform 210 makes strategies or instructions (such as cleaner dispatch, cleaner recruitment plan, cleaner training plan, etc.) related to cleaner management based on the processing of the collected data.

In some embodiments, the system 200 may be applied to the road cleanliness evaluation. When applied to the evaluation of road cleanliness, the object platform 230 may be used to collect data related to road cleanliness, such as whether the road has foreign objects, whether the road is flat, road cleanliness grade, etc. The object platform 230 may upload the collected data related to road cleanliness to the traffic sensor network platform 220, and the traffic sensor network platform 220 may summarize and process the collected data. For example, the traffic sensor network platform 220 may classify the collected data by a road name, a busy degree in an area (e.g., the more the flow in the area, the busier the area), etc. The traffic sensor network platform 220 then uploads the further collected and processed data to the traffic management platform 210, and the traffic management platform 210 makes strategies or instructions (such as scoring the road cleanliness and dispatching cleaning equipment according to the road cleanliness) related to the evaluation of road cleanliness based on the processing of the collected data.

In some embodiments, the system 200 may be composed of a plurality of subsystems for managing traffic road cleanliness in the smart city, and each subsystem may be applied to one scenario. In some embodiments, the system 200 may comprehensively manage and process the data obtained and output by each subsystem, and then obtain relevant strategies or instructions to assist the traffic road cleaning management of the smart city.

For example, the system 200 may include a subsystem applied to cleaning equipment management, a subsystem applied to cleaner management, a subsystem applied to road cleanliness evaluation, etc. The system 200 is the superior system of each subsystem.

The following will take the system 200 managing each subsystem and obtaining corresponding data based on the subsystem to obtain the strategy for smart city traffic road cleaning management as an example:

The system 200 may obtain the prediction data of cleanliness and vehicle/person flow based on the subsystem of cleanliness and flow prediction, obtain the data of road image and road vehicle/person flow based on the subsystem of outdoor environmental monitoring, and obtain the data of road congestion, road cleanliness and cleaning equipment scheduling based on the subsystem of cleaning equipment scheduling.

During the above data acquisition, the system 200 may separately set a plurality of object platforms for data acquisition corresponding to each subsystem.

After obtaining the above data, the system 200 summarizes and processes the collected data through the traffic sensor network platform 220. The traffic sensor network platform 220 then uploads the further summarized data to the traffic management platform 210. The traffic management platform 210 makes prediction data related to smart city traffic road cleaning management based on the processing of the collected data.

For example, the traffic sensor network platform 220 may make strategies or instructions related to cleaning equipment management, such as replacing cleaning equipment, repairing cleaning equipment, etc., based on data related to cleaning equipment, such as service year of cleaning equipment, cleaning capacity of cleaning equipment, model of cleaning equipment, failure rate of cleaning equipment, etc. The traffic sensor network platform 220 may upload the above strategies or instructions to the traffic management platform 210, and the traffic management platform 210 schedules the cleaning equipment based on the above strategies or instructions.

For another example, the traffic sensor network platform 220 may make strategies or instructions related to cleaner management (such as cleaner dispatch, cleaner recruitment plan, cleaner training plan, etc.) based on data related to cleaner management and data related to cleaning equipment (such as the number of cleaners, the leave situation of cleaners, the labor ability of cleaners and the service year of cleaning equipment, the cleaning ability of cleaning equipment, the failure rate of cleaning equipment, etc.). The traffic sensor network platform 220 may upload the above strategies or instructions to the traffic management platform 210, and the traffic management platform 210 may dispatch and schedule cleaners based on the above strategies or instructions.

For example, the traffic sensor network platform 220 may determine road congestion data based on road cleanliness, vehicle/person flow data, etc., and the traffic sensor network platform 220 may further determine cleaning equipment scheduling data based on road congestion data. The traffic sensor network platform 220 may upload the above data to the traffic management platform 210, which schedules the cleaning equipment based on the above data, and control the object platform 230 to monitor the road in varying degrees, such as adjusting the sampling rate of the camera.

For those skilled in the art, after understanding the principle of the system, it is possible to apply the system to any other suitable scenario without departing from this principle.

The system 200 will be described in detail below by taking the application of the system 200 to the road cleanliness evaluation scenario as an example.

The traffic management platform may refer to the Internet of things platform that plans and coordinates the connection and cooperation between various functional platforms and provides perceptual management and control management.

In some embodiments, the traffic management platform 210 is configured to perform the following operations: obtaining a road video captured by an imaging device on a road during a time period; extracting a target image from the road video and processing the target image through a prediction model to predict a road cleanliness; processing the road video in the time period and predicting a flow corresponding to the road; and controlling a road sweeper to clean the road based on the flow and the road cleanliness. For more descriptions of road video, target image and prediction model, see the specific content of FIG. 3.

In some embodiments, the target image includes a first target image; the prediction model includes a first prediction model.

In some embodiments, the traffic management platform 210 is configured to further perform the following operations: extracting a first target image from the road video, wherein the first target image is an image of which definition and/or number of vehicles meet preset requirements; the first prediction model is configured to process the first target image to predict the road cleanliness. For more description of the first target image and the first prediction model, see the specific content of FIG. 4.

In some embodiments, the traffic management platform 210 is configured to further perform the following operations: identifying the road video in the time period and identifying several target objects in the road video; extracting features of the several target objects, and filtering the several target objects through clustering; determining the flow based on results of filtering. For more description of the target objects and clustering, see FIG. 5.

In some embodiments, the traffic management platform 210 is configured to further perform the following operations: determining a sampling rate corresponding to the imaging device in the time period, wherein the imaging device is configured to capture the road video based on the sampling rate during the time period.

In some embodiments, the system 200 includes an object platform 220, which refers to the Internet of things platform for sensing information generation and controlling the final execution of information. In some embodiments, the object platform 220 may include an imaging device.

In some embodiments, the system 200 includes the traffic sensor network platform 230. The traffic sensor network platform refers to the Internet of things platform that realizes sensing information sensing communication and control information sensing communication, and connects the object platform and traffic management platform. In some embodiments, the traffic sensor network platform 230 may realize mutual communication between the traffic management platform 210 and the object platform 220. For example, the imaging device is located on the object platform 220, and the road video is obtained from the object platform 220 by the traffic sensor network platform 230 and sent to the traffic management platform 210.

It should be understood that the system and its platform shown in FIG. 2 may be implemented in various ways. For example, in some embodiments, the traffic management platform 210 may be provided in the server 110 in FIG. 1.

It should be noted that the above description of the system 200 and its platform is only for convenience of description, and this specification cannot be limited to the scope of the embodiments. It can be understood that after understanding the principle of the system, those skilled in the art may arbitrarily combine various platforms or form a subsystem to connect with other platforms without departing from this principle. In some embodiments, the traffic management platform 210, the object platform 220 and the traffic sensor network platform 220 disclosed in FIG. 2 may be different platforms in one system, or one platform to realize the functions of the above two or more platforms. For example, each platform may share one object platform, and each platform may also have its own object platform. Such deformation is within the protection scope of this disclosure.

Figure 3:
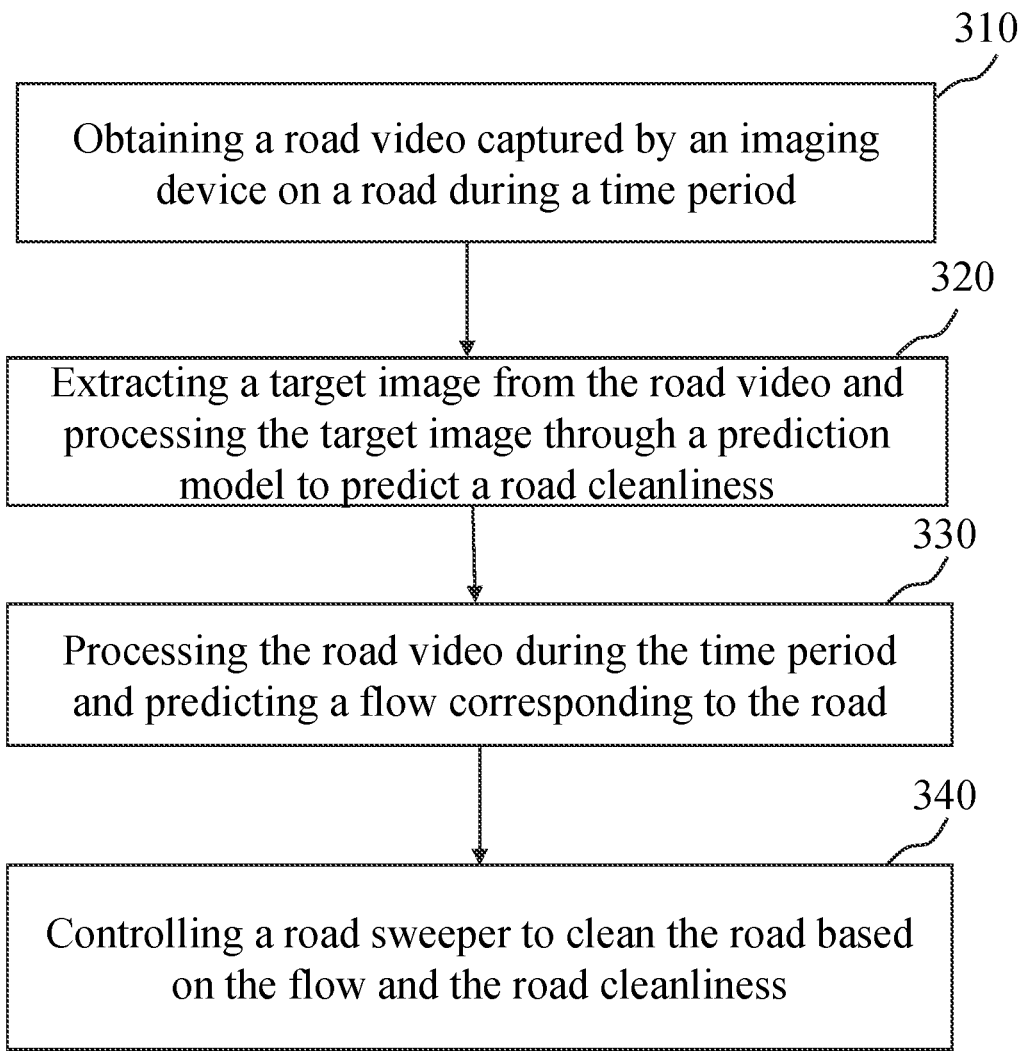
FIG. 3 is an exemplary flowchart of the method for managing traffic road cleaning in a smart city according to some embodiments of the present disclosure.

FIG. 3 is an exemplary flowchart of the method for managing traffic road cleaning in a smart city according to some embodiments of the present disclosure. As shown in FIG. 3, the process 300 includes the following steps. In some embodiments, the process 300 may be performed by the traffic management platform 210.

The traffic management platform may be an Internet of things platform that coordinates the connection and cooperation between various functional platforms and provides perceptual management and control management. The traffic management platform may include the processing device in FIG. 1 and other components. In some embodiments, the traffic management platform may obtain the road video of the road from the traffic sensor network platform and determine the cleaning plan of cleaning equipment (such as a road cleaning vehicle) based on processing of the road video by the traffic management platform. In some embodiments, the traffic management platform may be a remote platform controlled by managers, artificial intelligence, or preset rules. See FIG. 2 for more description of the traffic management platform.

In step 310, obtaining a road video captured by an imaging device on a road during a time period.

In some embodiments, the road may be a highway, street, etc., driven by motor or non motor vehicles, or a path for people or other organisms. In some embodiments, individuals and/or groups traveling in the road will generate flow, which may be used to judge the number of individuals passing through the road in unit time.

The imaging device may be a device for obtaining the road video. For example, the imaging device may include a camera, a smart phone, a smart computer, a smart bracelet, a wearable device, and the like. In some embodiments, the imaging device may obtain videos and images of the road in a certain time period. In some embodiments, the imaging device may further process the road video, such as extracting the target image in the road video.

The time period may be the length of time for the imaging device to capture a road video, for example, 5 minutes, 1.5 hours, etc. In some embodiments, the time period may be determined based on a user or preset by a system.

The road video may be a video related road. In some embodiments, the road video may reflect the situation of the road during the photographing time period, such as cleaning condition, whether there are foreign objects, vehicle/person flow, accident/violation condition, etc.

In some embodiments, the road video may be obtained based on the imaging device such as a surveillance camera, or through a network monitoring platform, user upload, etc.

In some embodiments, the method for managing traffic road cleaning in a smart city may include: determining a sampling rate corresponding to the imaging device in the time period; the imaging device is configured to capture the road video based on the sampling rate during the time period.

The sampling rate may be the sampling frequency of the imaging device. The road video is captured based on this sampling rate by the imaging device. For example, the sampling rate may be 30 Hz to 10 kHz. In some embodiments, the sampling rate may reflect the clarity and fluency of the road video. The larger the sampling rate, the clearer and more fluency the road video.

In some embodiments, the sampling rate may be the frame rate or frame frequency of the imaging device, such as 60 frames per second, that is, 60 signal samples are acquired per second. The larger the sampling rate, the more road videos the imaging device takes in unit time, the more image materials are provided, and the more accurate the road cleanliness data based on more image materials is. However, with the increase of the number of samples required, the operation and storage load of the imaging device and processing equipment also increase. Therefore, it is necessary to reasonably control the sampling rate.

In some embodiments, the sampling rate may vary with other factors. For example, the sampling rate of the imaging device may be determined by the flow predicted in the previous time period. For example, the larger the predicted flow (e.g., pedestrian volume and/or vehicle volume) in the previous time period, the higher the sampling rate may be. When the vehicle/person flow is large, the road is likely to become dirty. Through the higher sampling rate, the clearer road videos may be obtained to facilitate the cleaning of the road sweepers. For the specific description of flow prediction, see FIG. 5 and its related description.

In some embodiments, the sampling rate of the imaging device is determined by the distance between the road sweeper and a shooting position (e.g., a position where the imaging device captures) of the imaging device. For example, the closer the distance, the higher the sampling rate. When the road sweeper is close to the shooting position of the imaging device, clearer road video may be obtained through high sampling rate, which may facilitate the road sweeper to clean the shooting position of the imaging device.

In some embodiments, the sampling rate may be determined based on the attributes of the road, for example, a higher sampling rate is adopted when the imaging device captures a highway; a lower sampling rate is adopted when the imaging device takes pictures of ordinary roads or sidewalks. In some embodiments, the sampling rate may also be determined in other ways, such as user settings, etc.

Through the method of determining the sampling rate in the embodiments of the present disclosure, the sampling rate may be adjusted according to the vehicle/person flow and the position of the road sweeper, so as to reduce the loss of the imaging device due to high sampling rate and the occupation of memory space by a large number of invalid road videos. In addition, when the road sweeper is close to the shooting position, let it clean the road near the shooting position, so as to save the distance of the road sweeper and improve the cleaning efficiency.

In some embodiments, the imaging device is located on the object platform 220, and the road video is obtained from the object platform 220 by the traffic sensor network platform 230 and sent to the traffic management platform 210.

The object platform 220 may be a functional platform for sensing information generation and controlling the final execution of information. In some embodiments, the object platform 220 may be a management platform of the second terminal 160. In some embodiments, the object platform may acquire the road video, for example, through the imaging device. In some embodiments, the object platform may also include other terminals other than the second terminal 160, such as an intelligent device, etc. In some embodiments, the object platform may be a remote platform manipulated by managers, artificial intelligence, or preset rules.

The traffic sensor network platform may be a platform for sensing information sensing communication and controlling information sensing communication, which may connect the object platform and the traffic management platform. In some embodiments, the traffic sensor network platform may be a user's decision-making platform. In some embodiments, the traffic sensor network platform may preprocess the information obtained from the object platform, for example, adjust the road video of the object platform to a format readable by the traffic management platform, delete the invalid content in the road video of the object platform, change the definition and file size of the road video of the object platform, etc.

In some embodiments, the traffic sensor network platform obtains the initially photographed original road video from the object platform, preprocesses the road video, and sends the preprocessed road video to the traffic management platform.

In step 320, extracting a target image from the road video and processing the target image through a prediction model to predict a road cleanliness.

The target image may be an image in the road video that is convenient for prediction by the prediction model. In some embodiments, the target image may be an image whose image content or image parameters meet a preset standard. For example, the image with high definition and small vehicle/person flow may reflect the road cleanliness.

In some embodiments, the target image may be extracted from the road video through the second terminal or the processing device. The extraction method may include identifying and extracting the image that meets the preset standard based on the image recognition algorithm. For example, the definition of each frame of the road video is recognized by Laplace operator, and the image with high definition is taken as the target image.

The prediction model may be a model for predicting road cleanliness. In some embodiments, the prediction model may be a machine learning model, such as convolutional neural networks (CNN), deep neural networks (DNN), etc., or a combination thereof. For the specific description of the prediction model, see FIG. 4 and its related description.

The road cleanliness may be used to measure the road cleaning condition. In some embodiments, the road cleanliness may be expressed in numerical values, for example, a larger value indicates a higher degree of road cleanliness, that is, the road is cleaner. In some embodiments, the road cleanliness may be expressed as a cleaning level, such as clean, relatively clean, dirty, and severely dirty.

In some embodiments, the road cleanliness may be determined based on the processing of the target image by the prediction model. See FIG. 4 for more details on predicting road cleanliness.

In step 330, processing the road video in the time period and predicting a flow corresponding to the road.

The flow may be the number of vehicles and pedestrians passing through a certain position of the road in a unit time. The flow may reflect the degree of congestion and popularity of the road. In some embodiments, the road cleanliness is related to the flow on the road. For example, the greater the flow, the worse the cleanliness.

In some embodiments, processing the road video in the time period includes manual processing, intelligent processing, etc. The manual processing may include manually identifying a flow of the road video to predict the flow corresponding to the road. The intelligent processing may include recognizing the road video based on a target object recognition model, extracting features and clustering based on the recognition results to predict the flow. For the specific description of processing the road video in the time period and predicting the flow, see FIG. 5 and its related description.

In some embodiments, step 320 and step 330 may be performed simultaneously, or step 330 may be performed first and then step 320. The numbering and sequence of the above steps are not intended to limit the sequence of the above steps.

In step 340, controlling the road sweeper to clean the road based on the flow and the road cleanliness.

The road sweeper may be a device for cleaning a road. In some embodiments, the road sweeper may be the cleaning device 130. For the specific description of the road sweeper, refer to the description of the cleaning device 130 in FIG. 1, which will not be repeated here.

In some embodiments, the traffic management platform may control the road sweeper to clean the roads with poor road cleanliness and low flow.

In some embodiments, the traffic management platform may send control instructions to the road sweeper through the network. The road sweeper may execute the corresponding operation based on the instructions, or indirectly realize the operation corresponding to the instructions through the driver of the road sweeper.

Through the method for managing traffic road cleaning in a smart city described in some embodiments of the present disclosure, the real-time monitoring of road sanitation and cleaning may be realized; cleaning situations that may affect traffic safety and lead to traffic congestion may be handled timely through the method described in some embodiments of the present disclosure; the road sweeper may be allocated on demand, and human costs and social resources may be saved through the method described in some embodiments of the present disclosure.

It should be noted that the above description of process 300 is only for example and explanation, and does not limit the scope of application of this specification. For those skilled in the art, various modifications and changes may be made to the process 300 under the guidance of the present disclosure. However, these amendments and changes are still within the scope of present disclosure. For example, the process 300 may also include an information storage step.

Figure 4:
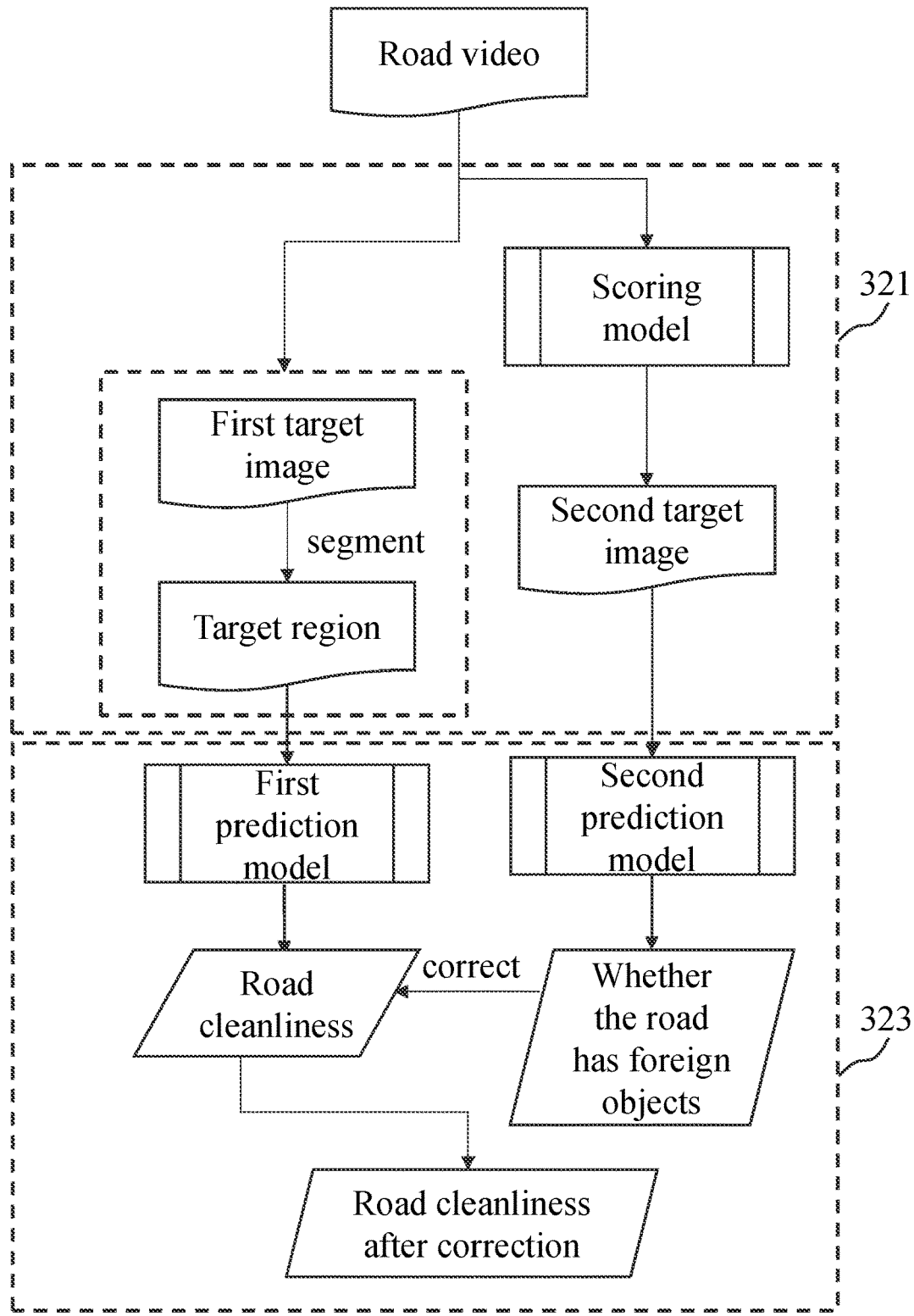
FIG. 4 is an exemplary schematic diagram of the step 320 of predicting road cleanliness shown in FIG. 3 according to some embodiments of the present disclosure.

FIG. 4 is an exemplary schematic diagram of the step 320 of predicting road cleanliness shown in FIG. 3 according to some embodiments of the present disclosure. In some embodiments, the step 320 may be performed by the processing device 120 of the traffic management platform 210.

In step 321, extracting a first target image from the road video.

In some embodiments, the target image may include the first target image.

The first target image may be an image in which the definition and/or the number of vehicles meet the preset requirements. For example, the first target image may be an image with a sampling rate greater than 120 Hz or greater than 20 frames per second, or an image with less than 5 vehicles.

In some embodiments, the first target image may be determined by algorithm recognition. For example, the definition of the image is recognized by Laplace operator. The target image with a sampling rate greater than 120 Hz is taken as the first target image. In some embodiments, the first target image may be automatically determined by the imaging device. For example, the imaging device automatically outputs the image whose sampling rate meets the preset requirements at the time of acquisition as the first target image.

In some embodiments, the first target image may be determined by the first target image recognition model. For example, the vehicles in the image may be recognized by a Yolo model, and the target image with less than 5 vehicles is taken as the first target image. In some embodiments, the input of the Yolo model may be a single frame image of the road video, and the output may be a segmentation result of a single frame image, a recognition result of a single frame image, etc.

In some embodiments, the target image may include a second target image.

The second target image may be an image containing complete information of the foreign objects. The complete information of the foreign objects refers to image information that can reflect a relationship between the foreign objects or types of the foreign objects and the position of the road or ground. For example, the complete information of the foreign objects can reflect that an image of an empty plastic bottle garbage on the ground, an image of a pile of sand in the middle of the road, etc. In some embodiments, the second target image may also be an image containing part information of the foreign objects. For example, the second target image may be an incomplete stone image due to pedestrian or vehicle occlusion.

In some embodiments, the images in the road video may be scored based on a scoring model, and the second target image may be determined based on the scores. The scores represent the integrity of foreign objects in the images, and a score of the second target image meets the preset requirements.

The scoring model may be a model for scoring an image based on foreign object integrity to determine the second target image. Through the scoring model, each frame image may be combined. The foreign objects in the road may be determined and further the integrity of the foreign objects may be determined before scoring by excluding the moving parts (such as vehicles, pedestrians, etc.) in each frame of the image. In some embodiments, the scoring model may be a sequence-to-sequence model. For example, the scoring model may be a recurrent neural network (RNN), a long short-term memory (LSTM), an encoder decoder and other models.

The score may be a reference value for evaluating the integrity of foreign object information in the image. For example, when the image may completely reflect one surface of the foreign object, such as the side surface, the scoring model may give a higher score, such as 95. When there is no foreign object in the image, or the foreign object is partially blocked by vehicles and/or pedestrians, the scoring model may give a lower score, such as 15. When the image score exceeds the score threshold (e.g., the score is greater than 60), the image is taken as the second target image. In some embodiments, when the image contains at least two foreign objects, each foreign object may be scored respectively, and a highest score and a score threshold may be compared to determine the second target image.

In some embodiments, the input of the scoring model may be a multi frame image sorted by time series. The output may be whether each frame image of the group of images is a second target image, or a specific score of each frame image of the group of images. When outputting the specific score of each frame of the group of images, the scoring model also includes a score judgment layer. The score judgment layer is used to judge whether the specific score exceeds the score threshold. The image whose score exceeds the score threshold may be considered as the second target image.

In some embodiments, the scoring model may be trained by a plurality of labeled training samples. For example, multiple labeled training samples may be input into the initial scoring model. The loss function is constructed through the results of the label and the initial scoring model, and the parameters of the initial scoring model are updated iteratively based on the loss function. When the loss function of the initial scoring model meets the preset conditions, the model training is completed and the trained scoring model is obtained. Among them, the preset conditions may include the convergence of the loss function, the number of iterations reaching the threshold, etc. The loss function may be used to measure the performance of the scoring model. In some embodiments, the loss function of the training sample includes at least one weight coefficient, which is determined based on the sampling rate. For example, n training samples $x_1, x_2, \ldots x_n$ corresponds to label $y_1, y_2, \ldots y_n$. Suppose that when the loss function is the mean square error loss function, add a weight coefficient to the loss function of each training sample, and the formula is as follows:

$$MSE = \frac{\sum_{i=1}^{n} w_i(y_i - y_i^p)^2}{n}$$

where MSE is the loss function of mean square error, $w_i$ is the weight coefficient corresponding to sample $x_i$, $y_i$ is the label corresponding to sample $x_i$, $y_i^p$ is the supervision data corresponding to sample $x_i$. In some embodiments, a higher weight coefficient $w_i$ may be assigned to the sample $x_i$ with high definition, high sampling rate or key information to improve its influence in the loss function.

In some embodiments, the training sample may be a historical scoring image, and the training sample may be obtained by invoking the historical scoring situation.

By adding the weight coefficient to the loss function, the training proportion of image with high definition may be improved and the adverse effect of invalid training content may be reduced. Finally, a more accurate training model may be obtained.

In some embodiments, the label of an image with a foreign object may be set to 1, and the label of another image with the same foreign object can be determined based on the similarity with the image with label 1. In some embodiments, the similarity may be determined by calculating the Euclidean distance between the image features based on the image features of the image with label 1 and the another image. The image features of the image may be determined by the convolution neural network of the first prediction model or the second prediction model. For the specific description of image feature determination, see the relevant description of the first prediction model and the second prediction model. In some embodiments, the similarity may also be determined by manual annotation.

Through the scoring model in some embodiments of the present disclosure, the determination of foreign objects in the road may be realized. Adding the weight coefficient to the loss function can improve the training proportion of image with high definition and thus a more accurate training model can be obtained. In addition, by labeling the samples based on similarity, each frame of the road video may be determined, thereby improving the number of samples and make the training process closer to the actual situation.

In step 323, processing the target image through a prediction model to predict a road cleanliness.

In some embodiments, the prediction model includes a first prediction model. Processing the target image through the prediction model to predict the road cleanliness includes processing the first target image through the first prediction model to predict the road cleanliness.

The first prediction model may be a model for predicting the degree of the road cleanliness. For example, the first prediction model may be a combined model of convolutional neural networks (CNN) and deep neural networks (DNN).

In some embodiments, the input of the first prediction model may be a single frame image of the first target image, and the output may be the road cleanliness. In some embodiments, the input of the convolutional neural network of the first prediction model may be a single frame image of the first target image, and the output of the convolutional neural network of the first prediction model may be an image feature corresponding to the single frame image. The input of the depth neural network of the first prediction model may be the output of the convolutional neural network, that is, the image features corresponding to a single frame image, and the output of the depth neural network of the first prediction model may be the road cleanliness. Among them, the image features may be color features, texture features, shape features, spatial relationship features and so on.

In some embodiments, when the first prediction model is a combined model of convolutional neural network and deep neural network, the first prediction model may be obtained through joint training. The processing device 120 may train the initial convolution neural network and the initial deep neural network based on a large number of labeled training samples. Specifically, the labeled training samples are input into the initial convolutional neural network, and the parameters of the initial convolutional neural network and the initial deep neural network are updated through training until the trained convolutional neural network and the deep neural network meet the preset conditions, so as to obtain the trained convolutional neural network and the deep neural network. The preset conditions may be that the loss function is less than the threshold, convergence, or the training cycle reaches the threshold.

In some embodiments, the training sample may be a historical road video, which may be obtained by invoking historical monitoring.

In some embodiments, the label trained by the first prediction model may be the cleanliness indicated by the first target image in the historical road video, and the label may be obtained by manual annotation.

Through the first prediction model of some embodiments of the present disclosure, it may realize the intelligent determination of the road cleanliness. In addition, the combination of road sanitation and urban road monitoring increases the diversity of the usage of road monitoring images.

In some embodiments, the first target image may be segmented to determine a target region. The target region may be processed based on the first prediction model to determine the road cleanliness.

In some embodiments, the input of the first prediction model is the target region of the first target image. The target region may be a region where vehicles drive and/or pedestrians walk in the first target image. For example, the target region may be a portion of a road, a sidewalk, or the like in the first target image.

In some embodiments, the target region may be determined by manual division or by machine learning model division, such as Yolo model division.

In some embodiments, the input of the Yolo model may be the first target image, and the output may be a result of classified target regions of the first target image. The result includes a plurality of recognition regions and the category corresponding to each recognition region. For example, the recognition region with the category of "road" may be used as the target region.

In some embodiments, the prediction model may include a second prediction model. The processing the target image through a prediction model to predict a road cleanliness also comprises: processing the second target image to determine whether there is foreign object on the road through the second prediction model. The road cleanliness is corrected based on the foreign object condition of the road.

The second prediction model may be a model for judging whether there is foreign object on the road. For example, the second prediction model may be a combined model of convolutional neural networks (CNN) and deep neural networks (DNN).

The foreign objects may be other objects (e.g., litter) distinguished from roads, vehicles and pedestrians in the image. For example, the foreign objects may be an empty plastic bottle, a pile of garbage, etc.

In some embodiments, the input of the second prediction model may be a single frame image, and the output of the second prediction model may be whether there is a foreign object on the road. In some embodiments, the input of the convolutional neural network of the second prediction model may be a single frame image, and the output of the convolutional neural network of the second prediction model may be the image feature corresponding to the single frame image. The input of the depth neural network of the second prediction model may be the output of the convolutional neural network, that is, the image features corresponding to a single frame image, and the output the depth neural network of the second prediction model may be whether there are foreign objects on the road. In some embodiments, the convolutional neural network of the second prediction model may be obtained by the migration of the convolutional neural network of the first prediction model. For the description of the image features, see the description of the first prediction model.

In some embodiments, the convolutional neural network of the first prediction model or the second prediction model obtained after the training process may also be used for the above scoring model. Specifically, the convolutional neural network of the first prediction model or the second prediction model obtained after the training process may be used to calculate the similarity between images and extract the image features of the input image. For example, a single frame image may be input to the convolutional neural network of the first prediction model or the second prediction model, and the image features corresponding to the image may be output. Based on image features, the similarity is obtained by calculating the Euclidean distance between image features.

In some embodiments, when the second prediction model is a combined model of convolutional neural network and deep neural network, the second prediction model may be obtained through joint training. The training module may train the initial convolution neural network and the initial deep neural network based on a large number of labeled training samples. Specifically, the labeled training samples are input into the initial convolutional neural network, and the parameters of the initial convolutional neural network and the initial deep neural network are updated through training until the trained convolutional neural network and the deep neural network meet the preset conditions, so as to obtain the trained convolutional neural network and the deep neural network. The preset conditions may be that the loss function is less than the threshold, convergence, or the training cycle reaches the threshold.

In some embodiments, the training sample may be a historical road video, which may be obtained by invoking historical monitoring.

In some embodiments, the label trained by the second prediction model may be whether there is foreign object in the single frame image of the historical road video, and the label may be obtained by manual annotation.

In some embodiments, the road cleanliness is corrected based on the condition of the foreign object of the road to obtain a corrected road cleanliness. In some embodiments, the correction may include reducing and/or degrading the road cleanliness output by the first prediction model when there is foreign object based on the output of the second prediction model. For example, when the first prediction model judges that the road cleanliness is high, for example, the road cleanliness is 90. If the second prediction model judges that there is a foreign object on the road, the corrected road cleanliness is 20 points. In some embodiments, the correction rule may also include correcting the road cleanliness output by the first prediction model to a half value, correcting the road cleanliness output by the first prediction model to 0 or correcting the road cleanliness output by the first prediction model to a more dirty level or a serious dirty level, etc.

In some embodiments, the correction may also include scoring and/or upgrading the road cleanliness output by the first prediction model when there is no foreign object based on the output of the second prediction model. For example, when the first prediction model judges that the road cleanliness is 60, if the second prediction model judges that there is no foreign object on the road, the corrected road cleanliness is 90. In some embodiments, the correction rule may also include correcting the road cleanliness output by the first prediction model to 100, correcting the road cleanliness output by the first prediction model to a cleaning level or a relatively clean level, etc.

Through the correction process described in some embodiments of the present disclosure, the misjudgment of the road cleanliness caused by ignoring a foreign object in the model can be avoided, the impact on road cleaning and even vehicle/pedestrian safety caused by the neglect of a large foreign object such as a brick and an oil bucket ignored by the model can be avoided, thus the evaluation of cleanliness can more conform to the actual situation.

Figure 5:
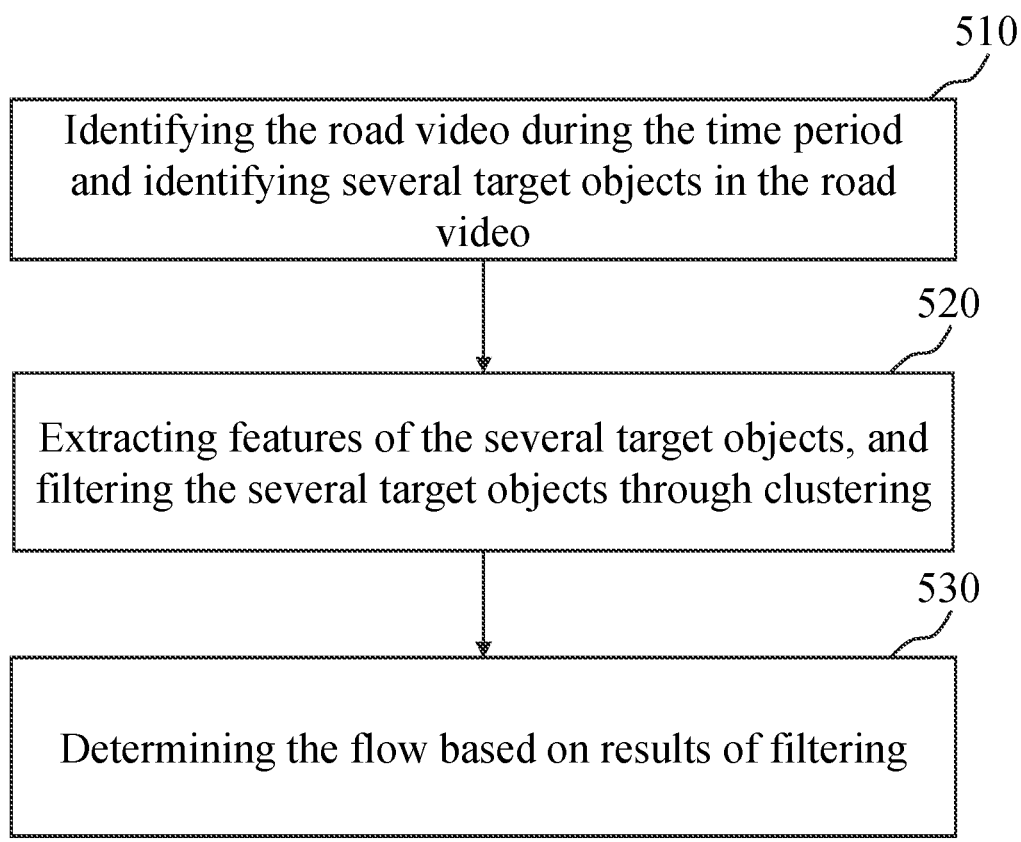
FIG. 5 is an exemplary flowchart of the step 330 of predicting flow corresponding to the road shown in FIG. 3 according to some embodiments of the present disclosure.

FIG. 5 is an exemplary flowchart of the step 330 of predicting flow corresponding to the road shown in FIG. 3 according to some embodiments of the present disclosure. In some embodiments, the step 330 may be performed by the processing device 120 of the traffic management platform 210.

In step 510, identifying the road video during the time period and identifying several target objects in the road video.

A target object may be a biological or non biological object related to the flow to be counted, such as motor vehicles, non motor vehicles, pedestrians, etc.

In some embodiments, the target object recognition process may be realized by the target object recognition model, for example, the target object in the road video may be recognized by the Yolo model. The input of the target object recognition model may be a single frame image of the road video, and the output may include the recognition block of the target object.

In step 520, extracting features of the several target objects, and filtering the several target objects through clustering.

The features of the target object may be image features related to the target object, such as vehicle license plate, vehicle tire, pedestrian head, etc. In some embodiments, the features of the target object also include the moving features of the target object, such as the features of vehicle driving, pedestrian walking, etc.

In some embodiments, the features of the target object are extracted by a feature extraction model. The feature extraction model may be convolution neural network model, feature detection algorithm (Histogram of Oriented Gridients, HOG), etc.

In some embodiments, the input of the feature extraction model may be the identification frame of the target object, and the output may be the feature of the target object.

In some embodiments, the target objects with the same feature are clustered in the same cluster center through the clustering method to realize the filtering of the target objects.

The cluster center may be a set of target objects with the same or similar features. The clustering methods may include K-means clustering, mean shift clustering and so on. For example, in a road video, a target object in the 10th frame image and a target object in the 20th frame image belong to the same cluster center after clustering. This indicates that the two target objects are the same object, e.g., the same person or the same car. Different target objects are clustered in different cluster centers, and the same target objects are clustered in the same cluster center to realize the filtering of target objects, thereby preventing the same object from being calculated repeatedly when determining the flow.

In step 530, determining the flow based on result of filtering.

In some embodiments, the filtered result may include at least one cluster center. In some embodiments, the traffic situation in a certain time period is determined by counting the number of cluster centers in that time period. For example, when the number of cluster centers is 2000, it may be approximately considered that the number of people/vehicles passing through the road in this period of time is 2000.

Through the flow determination method of some embodiments of the present disclosure, the repeated statistics of the same pedestrian/vehicle may be avoided based on clustering. Statistics based on models may reduce the cost and improve the efficiency of the process.

Some embodiments of the present disclosure also disclose a computer-readable storage medium, which stores computer instructions. When the computer reads the computer instructions in the storage medium, the computer runs the above the method for managing traffic road cleaning in a smart city.

The basic concepts have been described above. Obviously, for those skilled in the art, the above detailed disclosure is only an example and does not constitute a limitation of the present disclosure. Although not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

At the same time, the present disclosure uses specific words to describe the embodiments of the present disclosure. For example, "one embodiment", and/or "some embodiments" refer to a feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, some features or structures in one or more embodiments of the present disclosure may be combined appropriately.

In addition, unless explicitly stated in the claims, the order of processing elements and sequences, the use of numbers and letters, or the use of other names described in the present disclosure are not used to limit the order of processes and methods in the present disclosure. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the present disclosure. For example, although the system components described above may be implemented by hardware devices, they may also be implemented only by software solutions, such as installing the described system on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, this disclosure method does not mean that the object of the present disclosure needs more features than those mentioned in the claims. In fact, the features of the embodiment are less than all the features of the single embodiment disclosed above.

In some embodiments, numbers describing the number of components and attributes are used. It should be understood that such numbers used for the description of embodiments are modified by the modifiers "about", "approximate" or "generally" in some examples. Unless otherwise stated, "approximately" or "substantially" indicates that a ±20% change in the number is allowed. Accordingly, in some embodiments, the numerical parameters used in the description and claims are approximate values, which may be changed according to the required features of individual embodiments. In some embodiments, the numerical parameters should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials referenced in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later attached to the present disclosure). It should be noted that in case of any inconsistency or conflict between the description, definition and/or use of terms in the auxiliary materials of the present disclosure and the contents described in the present disclosure, the description, definition and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teaching of the present disclosure. Accordingly, the embodiments of the present disclosure are not limited to those explicitly introduced and described in the present disclosure.

What is claimed is:

1. A method for managing traffic road cleaning in a smart city, executed by a traffic management platform, comprising:
   obtaining a road video captured by an imaging device on a road during a time period;
   extracting a target image from the road video and processing the target image through a prediction model to predict a road cleanliness, wherein
   the target image includes a first target image and a second target image, wherein the first target image is an image of which definition and/or a number of vehicles meet preset requirements, and the second target image is an image containing complete information of foreign objects or an image containing part information of the foreign objects;
   the prediction model includes a first prediction model and a second prediction model, wherein the first prediction model is a combined model of convolutional neural network and deep neural network, and the second prediction model is a combined model of the convolutional neural network and the deep neural network;
   wherein the extracting a target image from the road video and processing the target image through a prediction model to predict a road cleanliness comprises:
   extracting the first target image from the road video;
   segmenting the first target image to determine a target region, wherein the target region is a region where vehicles drive and/or pedestrians walk in the first target image;
   inputting the target region in a single frame image of the first target image into the convolutional neural network of the first prediction model to output a first image feature corresponding to the single frame image; and inputting the first image feature corresponding to the single frame image into the depth neural network of the first prediction model to output the road cleanliness;
   inputting a single frame image of the second target image into the convolutional neural network of the second prediction model to output a second image feature corresponding to the single frame image; and inputting the second image feature corresponding to the single frame image into the depth neural network of the second prediction model to output a foreign object condition of the road; and
   correcting the road cleanliness based on the foreign object condition of the road;
   processing the road video during the time period and predicting a flow corresponding to the road; and
   controlling a road sweeper to clean the road based on the flow and the corrected road cleanliness.

2. The method of claim 1, wherein the processing the road video during the time period and predicting a flow corresponding to the road comprises:
   identifying the road video during the time period and identifying several target objects in the road video;
   extracting features of the several target objects, and filtering the several target objects through clustering; and
   determining the flow based on a result of filtering.

3. The method of claim 1, further comprising:
   determining a sampling rate corresponding to the imaging device during the time period; wherein the imaging device is configured to capture the road video based on the sampling rate during the time period.

4. The method of claim 1, wherein
   the imaging device is located on an object platform, and the road video is obtained from the object platform by a traffic sensor network platform and sent to the traffic management platform.

5. An Internet of Things (IOT) system for managing traffic road cleaning in a smart city, comprising a traffic management platform, wherein the traffic management platform is configured to perform the following operations including:

obtaining a road video captured by an imaging device on a road during a time period;

extracting a target image from the road video and processing the target image through a prediction model to predict a road cleanliness, wherein the target image includes a first target image and a second target image, wherein the first target image is an image of which definition and/or a number of vehicles meet preset requirements, and the second target image is an image containing complete information of foreign objects or an image containing part information of the foreign objects;

the prediction model includes a first prediction model and a second prediction model, wherein the first prediction model is a combined model of convolutional neural network and deep neural network, and the second prediction model is a combined model of the convolutional neural network and the deep neural network;

wherein the extracting a target image from the road video and processing the target image through a prediction model to predict a road cleanliness comprises:

extracting the first target image from the road video;

segmenting the first target image to determine a target region, wherein the target region is a region where vehicles drive and/or pedestrians walk in the first target image;

inputting the target region in a single frame image of the first target image into the convolutional neural network of the first prediction model to output a first image feature corresponding to the single frame image; and inputting the first image feature corresponding to the single frame image into the depth neural network of the first prediction model to output the road cleanliness;

inputting a single frame image of the second target image into the convolutional neural network of the second prediction model to output a second image feature corresponding to the single frame image; and inputting the second image feature corresponding to the single frame image into the depth neural network of the second prediction model to output a foreign object condition of the road; and correcting the road cleanliness based on the foreign object condition of the road;

processing the road video in the time period and predicting a flow corresponding to the road; and controlling a road sweeper to clean the road based on the flow and the corrected road cleanliness.

6. The IOT system of claim 5, wherein the traffic management platform is further configured to perform the following operations including:

identifying the road video during the time period and identifying several target objects in the road video;

extracting features of the several target objects, and filtering the several target objects through clustering; and determining the flow based on a result of filtering.

7. The IOT system of claim 5, wherein the traffic management platform is further configured to perform the following operations including:

determining a sampling rate corresponding to the imaging device during the time period; wherein the imaging device is configured to capture the road video based on the sampling rate during the time period.

8. The IOT system of claim 5, further comprising an object platform and a traffic sensor network platform, wherein the imaging device is located on the object platform, and the road video is obtained from the object platform by the traffic sensor network platform and sent to the traffic management platform.

9. A computer-readable storage medium, which stores computer instructions, wherein when the computer reads the computer instructions in the storage medium, the computer runs the method for managing traffic road cleaning in a smart city of claim 1.

10. The method of claim 1, wherein the first prediction model is obtained through joint training of the convolutional neural network and the deep neural network based on first training samples and first labels, wherein the first training samples include a historical road video, and the first labels are a road cleanliness of a first target image in the historical road video, the joint training including:

inputting the training samples into an initial convolution neural network and an initial deep neural network;

updating parameters of the initial convolutional neural network and parameters of the initial deep neural network through training until meeting a preset condition, wherein the preset condition is that a loss function is less than a threshold, the loss function converges, or a training cycle reaches a threshold; and obtaining the convolutional neural network and the deep neural network.

11. The method of claim 1, wherein the second prediction model is obtained through joint training of the convolution neural network and the deep neural network based on second training samples and second labels, wherein the second training samples include a historical road video, and the second labels are whether there is foreign object in a single frame image of the historical road video, the joint training including:

inputting the second training samples into an initial convolutional neural network and an initial deep neural network;

updating parameters of the initial convolutional neural network and parameters of the initial deep neural network are through training until meeting a preset condition, wherein the preset condition is that a loss function is less than the threshold, convergence, or the training cycle reaches the threshold;

obtaining the convolutional neural network and the deep neural network.

12. The method of claim 1, wherein the second target image is determined based on a process including:

scoring images in the road video based on a scoring model, wherein the scoring model is a machine learning model;

determining the second target image based on scores of the images, wherein the scores represent an integrity of foreign object in the images;

wherein an input of the scoring model is a multi-frame image sorted by time series; and an output of the scoring model is a score of each frame image of the multi-frame image.

13. The method of claim 12, wherein the scoring model is obtained by training based on training samples and labels, wherein the training samples are a historical scoring image, and the labels are a score of the historical scoring image, the training including:

inputting the training samples into an initial scoring model;

constructing a loss function based on an output of the initial scoring model and the labels;

updating parameters of the initial scoring model iteratively based on the loss function until meeting a preset condition, wherein the preset condition includes a convergence of the loss function or a number of iterations reaching the threshold; and the loss function includes at least one weight coefficient, which is determined based on a sampling rate.

14. The method of claim 3, wherein the sampling rate of the imaging device is determined based on a predicted flow for a previous time period, wherein the larger the predicted flow for the previous time period, the higher the sampling rate.

15. The method of claim 3, wherein the sampling rate of the imaging device is determined based on a distance between the road sweeper and a shooting position of the imaging device, wherein the closer the distance, the higher the sampling rate.

\* \* \* \* \*